United States Patent [19]

Marino

[11] 4,330,056
[45] May 18, 1982

[54] MINE CONVEYOR BELT MAN CROSSOVER

[76] Inventor: Salvatore R. Marino, Marino Construction Co., General Contractors, 818 Allegheny River Blvd., Oakmont, Pa. 15139

[21] Appl. No.: 116,635

[22] Filed: Jan. 29, 1980

[51] Int. Cl.$^3$ ........................................... B65G 21/00
[52] U.S. Cl. ......................................... 198/860; 14/1; 14/70; 182/106
[58] Field of Search ................ 198/618, 804, 827–828, 198/830, 860–861, 866; 14/1, 2, 2.4, 2.6, 17, 69.5, 70, 74; 119/82; 299/19, 95, 18; 182/106, 113; 24/115 A

[56] References Cited

U.S. PATENT DOCUMENTS

| | | | |
|---|---|---|---|
| 2,779,958 | 2/1957 | Hodges et al. | 14/72 |
| 2,955,702 | 10/1960 | Long et al. | 198/861 |
| 3,189,926 | 6/1965 | Ehinger | 14/1 |
| 3,530,693 | 9/1970 | Dimond et al. | 68/202 |
| 3,878,936 | 4/1973 | Niggemyer | 198/861 |
| 4,118,816 | 10/1978 | Mittag | 14/69.5 |

FOREIGN PATENT DOCUMENTS 61563  5/1968  German Democratic Rep. ...... 14/1

Primary Examiner—Robert B. Reeves
Assistant Examiner—Douglas D. Watts
Attorney, Agent, or Firm—Buell, Blenko, Ziesenheim & Beck

[57] ABSTRACT

A man crossover for belt conveyors used in underground mines, the conveyors comprising spaced groups of belt-supporting rollers connected along each side of the conveyor by cables, comprises a light-weight frame and deck spanning the conveyor belt and supported above the upper flight thereof on the side cables. The supporting member at each end of the man crossover rests on its cable and is contoured to fit over it. The supporting members are locked in place on the cables with removable fittings. The man crossover deck is provided with handrails on each side. A man using the man crossover grasps the handrails with both hands, leans over the man crossover on his stomach and pushes himself onto the deck with his feet. He pulls himself over by the handrails swinging his legs around to the other end, and slides off, feet first.

3 Claims, 6 Drawing Figures

MINE CONVEYOR BELT MAN CROSSOVER

BACKGROUND OF THE INVENTION

It is conventional in underground coal mines and other mines to load the coal or other mineral at the mine face from a continuous miner machine which digs the mineral and dumps it onto a shuttle car which when loaded travels toward the belt conveyor, deposits its load on the belt conveyor and returns to the continuous miner for another load. This belt conveyor, called a subbelt, takes the mineral through the secondary mine tunnels and deposits it onto a transfer belt in the primary tunnels. The transfer belt transports the mineral onto the main belt in the main mine entry tunnel. The main belt removes the mineral from the mine for cleaning, sorting, and sizing operations.

Throughout the entire system of belt conveyor tunnels (workers use a different tunnel system to get to their working area) the belt conveyor passes through an area seldom higher than the thickness of the mineral seam. Since the belt conveyor tunnel is only intended to transport the mineral, and not provide height for mining employees the ceiling height is kept low to avoid costly removal of rock, earth, etc. Thus the belt conveyor passes through a confined area.

There is a constant need for mining employees to move safely and conveniently about the belt conveyor tunnels in performing their many duties such as belt checking, changing of rollers, or any necessary maintenance. They are also required to inspect and service conveyor belts and their supports, cables, roller arms, and electric service; to lend assistance to a coal mine employee on the other side of the belt, and at times to enter a perpendicular mine tunnel when the employee is on the side of the conveyor away from the entrance of the tunnel. These matters sometimes require them to cross over or under the moving belt conveyor.

In the present state of the art this is an unsafe thing to do. Under the conveyor belt are the hazards of conveyor belt support cable collapse, interfering cables, pulleys, wires, and minimal clearance between mine floor and bottom of conveyor belt. Over the belt are the hazards that moving coal may strike the coal mine employee, clothing may get caught on the belt and its moving parts, and the employee might fall onto the conveyor belt.

Conveyors for coal or like minerals must be installed so that the full load carried by the upper flight clears the mine roof. The spacing of the conveyor above the mine floor is not of much significance as long as the lower flight finds a return path. Mine floors generally follow the bottom of the seam and are not necessarily level. It is common practice, therefore, at least in coal mines, to suspend the conveyor from the mine roof. This is accomplished by boring holes in the mine roof and fixing the upper ends of roof bolts therein, the lower ends being attached to the conveyor frame. Those roof bolts are not necessarily the same roof bolts used to bolt together the various rock strata in the mine roof. A belt conveyor of the type generally employed in coal mines comprises an endless belt the upper flight of which is supported at intervals by groups of three rollers comprising a central horizontal roller and side or troughing rollers inclined upwardly and away from the center roller on each side to shape the upper flight of the belt into a shallow trough. Those roller groups are each mounted on a transverse roller tie bar which passes beneath the upper flight of the belt. The outboard ends of those tie bars are attached to the lower ends of the conveyor-supporting roof bolts. A wire rope or cable running along each side of the conveyor is also attached to the outboard ends of those tie bars, maintaining the spacing between them while allowing some lateral movement to compensate for uneven loading of the belt.

SUMMARY OF THE INVENTION

The man crossover of my invention comprises a lightweight frame and deck spanning the conveyor belt and supported above the upper flight thereof on the side cables. The supporting member at each end of the man crossover rests on its cable and is contoured to fit over it. The supporting members are locked in place on the cable with removable fittings. The man crossover deck is provided with handrails on each side. A man using the man crossover grasps the handrails with both hands, leans over the man crossover on his stomach and pushes himself onto the deck with his feet. He pulls himself over by the handrails, swinging his legs around to the other end, and slides off, feet first. The man crossover allows the man to cross over the moving belt conveyor safely and conveniently by taking advantage of the minimal space available above and to the sides of the upper flight of the belt conveyor in a confined area.

BRIEF DESCRIPTION OF DRAWINGS

An embodiment of my invention presently preferred by me is illustrated in the attached figures, to which reference is now made.

DESCRIPTION OF PREFERRED EMBODIMENT

Figure 1:
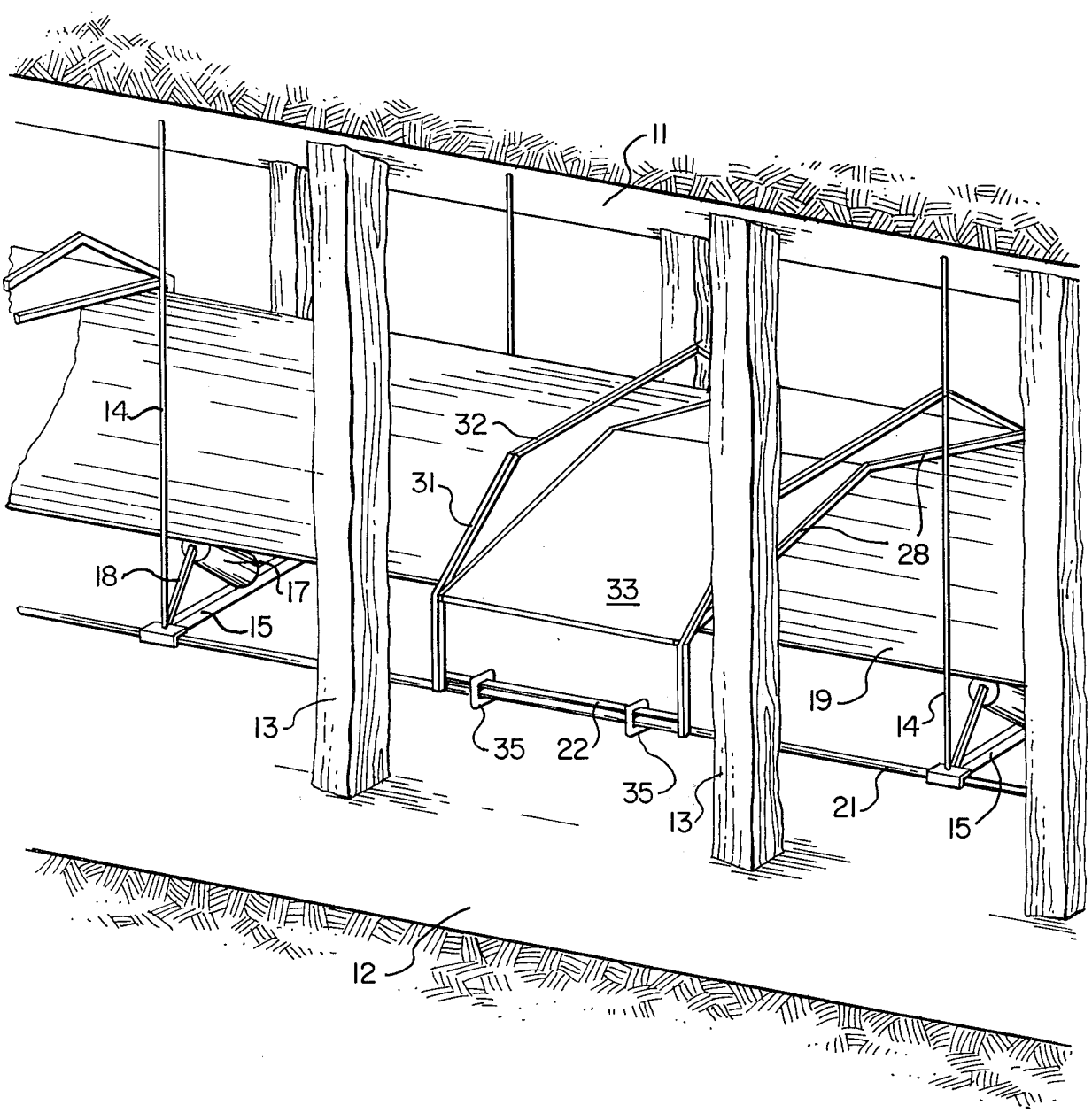
FIG. 1 is an isometric view of my invention in place on a belt conveyor in a passage of an underground mine.
Figure 3:
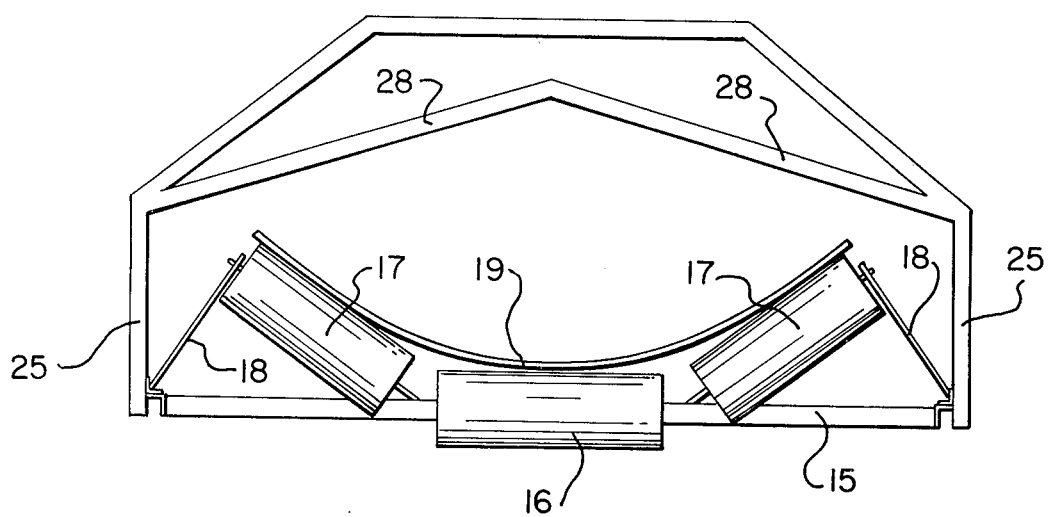
FIG. 3 is a cross-section of the belt conveyor and my man crossover showing the conveyor roller arrangement.

In FIG. 1 the mine roof 11 is supported from the mine floor 12 by pit props 13 spaced from each other along the gallery. Roof bolts 14 have their upper ends anchored in holes in roof 11 and their lower ends are attached to the outboard ends of roller tie bars 15 positioned crosswise of the gallery. As is shown in FIG. 3, roller tie bar 15 journals a center supporting roller 16. A troughing roller 17 is positioned on each side of center roller 16 inclined outwardly and upwardly therefrom on an axle having its inner end affixed to tie bar 15 and its outer end raised above that tie bar by side arm 18. The upper flight 19 of a conveyor belt travels in concave-up configuration over those rollers in successive sets spaced from each other. The lower flight of the conveyor, not shown, travels in the opposite direction underneath the above-mentioned roller assembly, looping around horizontal rolls at each end of the conveyor.

Figure 2:
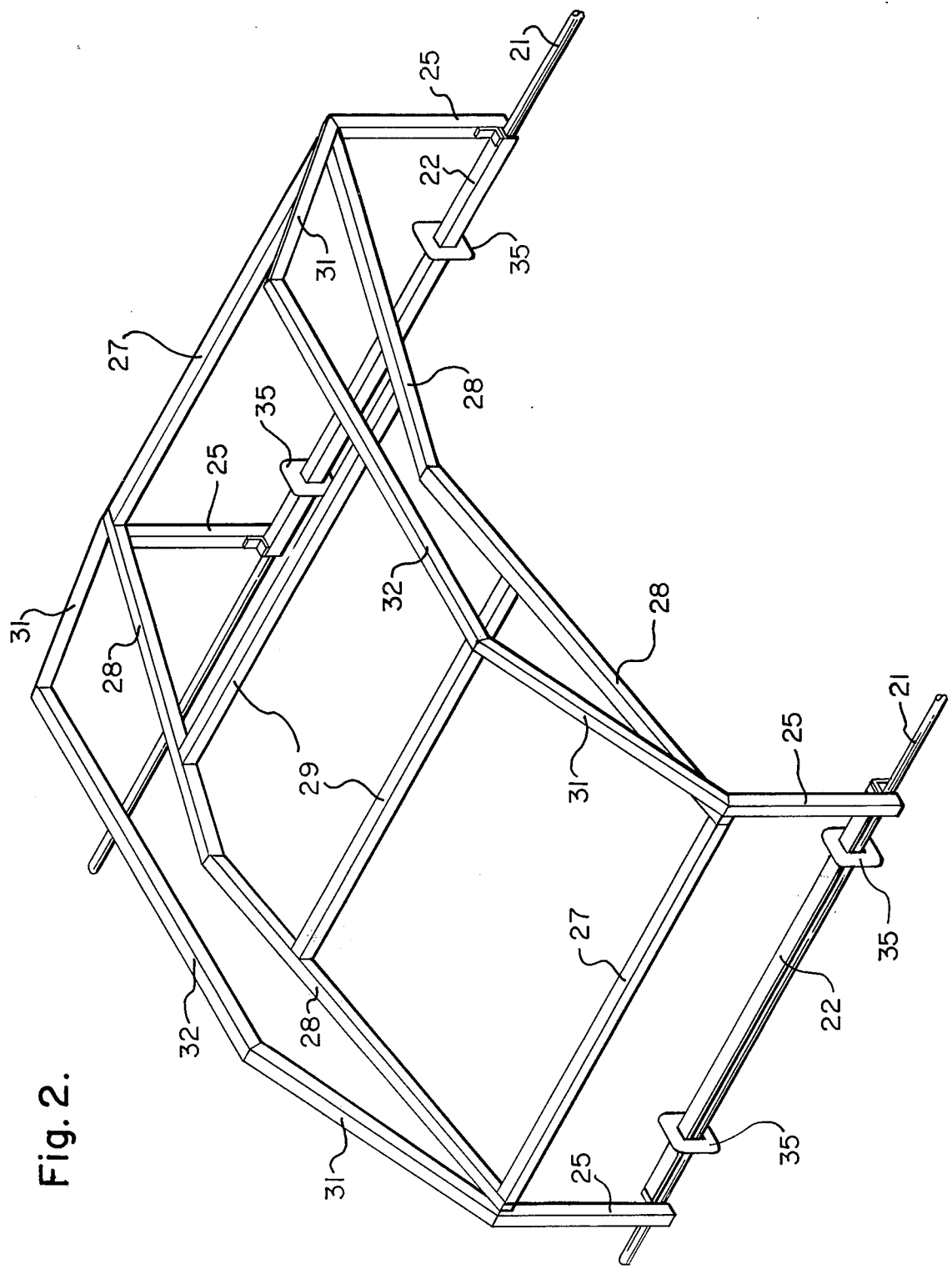
FIG. 2 is an isometric view of the frame of my man crossover supported on the conveyor cables.
Figure 4:
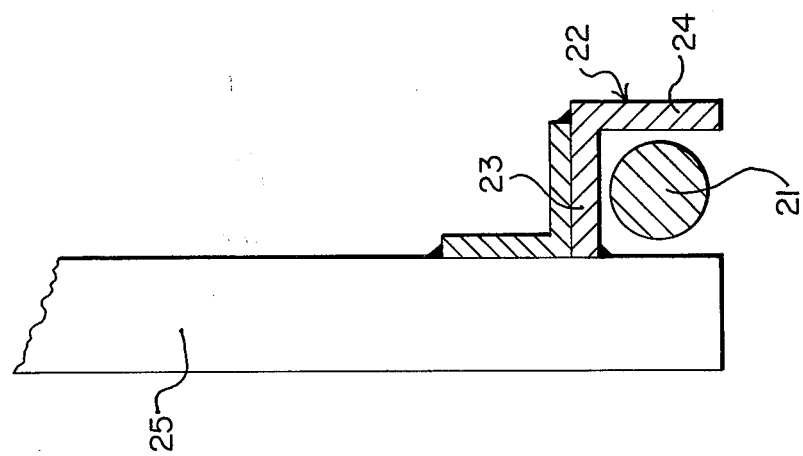
FIG. 4 is a detail of that portion of my man crossover which supports it on the conveyor's cables.

Successive roller tie bars 15 are connected on each side of the conveyor by a wire cable 21 as is shown in FIG. 1 and 2. My man crossover structure is supported on those cables. The cables, via the roof bolts, actually hold up the roller tie bars, the conveyor belt and the man crossover. The mine conveyor belt man crossover is supported by the apparatus it is intended to cross over. The supporting member 22 at each end of the man crossover is an angle positioned with one flange 23 lying on cable 21 and the other flange 24 extending downwardly along the inside of cable 21. Uprights 25, which may be square tubing, are welded at each end of member 22 to the upper flange 23 thereof with their lower ends extending below those flanges to form a channel fitting over cable 21, as shown in FIG. 4. Uprights 25 on the same side of the conveyor are connected at their upper ends by a longitudinal member 27 and uprights 25 opposite each other across the conveyor are connected at their upper ends by a pair of members 28, each member 28 being inclined upwardly from the transverse member 27 to the centerline of the conveyor and joined together there. Member 28 inclined upwardly acts as a longitudinal brace and as a base for the contoured deck. The frame so formed is braced longitudinally by a pair of bracing members 29, one on each side, parallel to longitudinal members 27 and spaced intermediate thereof. Handrails on each side of the man crossover are formed by members 31 welded at their outside ends to the upper ends of uprights 25 and inclined inwardly and upwardly therefrom at an angle greater than the angle of members 28, and horizontal members 32 connecting the inner ends of members 31. A sheet metal deck 33 is carried by frame members 27, 28 and 29.

Figure 5:
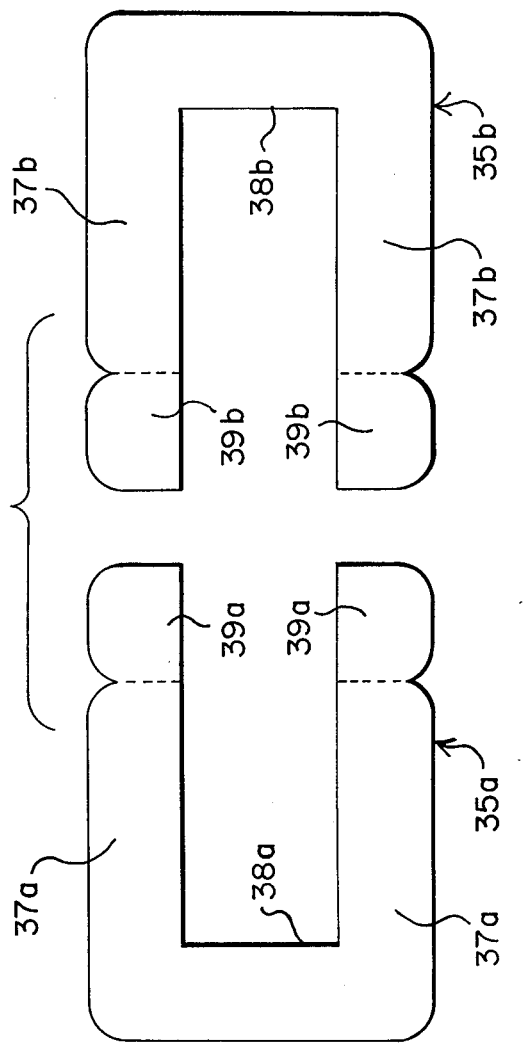
FIG. 5 is an exploded view in elevation of the removable locking fitting, showing the two identical elements comprising it.
Figure 6:
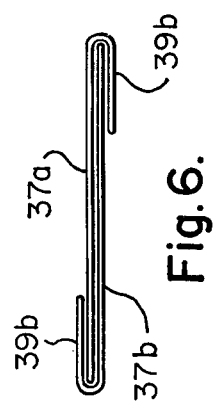
FIG. 6 is a plan of the assembled removable locking fitting.

Supporting members 22 are locked in position on their respective cables 21 by removable fittings 35 shown in place in FIGS. 1 and 2 and in detail in FIGS. 5 and 6. From FIG. 5 it will be seen that fitting 35 comprises two identical U-shaped members 35a and 35b. Each member has a pair of legs 37 projecting in the same direction and parallel to each other from the ends of a bottom portion 38. The length of bottom portion 38 is slightly greater than one dimension of member 22 in cross section. Each leg 37 is longer than the other dimension of member 22 in cross section by an amount sufficient to form a lug 39 which is bent around the other U-shaped member when the two are slipped over supporting member 22 and cable 21 from opposite sides. The lugs 39b of member 35b are bent around the closed end of legs 37a of member 35a and the lugs 39a of member 35a are bent around the closed end of legs 37b of member 35b. Members 35a and 35b are preferably made of heavy gauge sheet metal.

As I have mentioned there is little head room above the conveyor in the passages of coal mines and other mines and my man crossover is not designed to walk upon. In use the man crossover is positioned manually across the conveyor supported by the conveyor cables, which I have described. A miner intending to cross over the conveyor grasps the bridge handrails and leans over the man crossover deck so that his stomach rests thereon. He then pushes his body onto the deck with his feet and pulls himself over using the handrails. He swings his legs around during this maneuver so that they extend over the far side of the conveyor and with his hands pushes himself off the man crossover until his feet touch the floor.

My man crossover is designed to be constructed in standard lengths to use with conveyors of standard width, such as 30 inches, 36 inches and 42 inches. The width of the belt conveyor increases in these sizes as the subbelt becomes the transfer belt, and the transfer belt becomes the main belt. The mine conveyor belt man crossover may also be modified in construction according to the overhead clearance available. The overhead clearance available averages between 12 inches and 18 inches above the top part of the man crossover deck. In models I have constructed the overall height of the middle handrail section above the conveyor cables is about 20 inches. The height of the mid-point of the deck above the cables may be from 15 inches to about 17 inches depending on the width of the conveyor. The height of the load at the center of the conveyor belt of wider conveyors is somewhat less than that of narrower conveyors.

I claim:

1. A movable man crossover for underground belt conveyors having supporting cables extending longitudinally along each side thereof, comprising a pair of longitudinal members each contoured in cross section to rest on one of said cables and partially enclose the cables, a pair of flat U-shaped deformable members fitting around the longitudinal member and cable face-to-face, with the extending legs of each U-shaped member bent around the bottom portion of the other U-shaped member for fastening the longitudinal members to the supporting cables, a crossover deck connected at each end to one of said longitudinal members and supported thereby but spaced therefrom and a handrail attached to each side of the crossover deck.

2. A man crossover for a belt conveyor which is supported by a pair of parallel spaced apart horizontal cables above floor level and extending longitudinally along each side of the conveyor comprising:
   a. a first longitudinal member which partially encloses the cable and rests on top of the cable;
   b. a pair of first vertical members spaced apart and oriented vertically with respect to the first longitudinal member and each vertical member having a top edge and a bottom edge, the first longitudinal member joined near the bottom edge of the first vertical members and forming an inverted U-shaped configuration which encompasses a portion of the cable;
   c. a first horizontal bar member joining the two first vertical members adjacent their top edges;
   d. a pair of first spaning members angled upwardly from the top edges of the first vertical members, the spaning members each having a first end and a second end, the first ends joined at the top edges of the first vertical members and the first spaning members defining a plane;
   e. a second horizontal bar member joining the pair of first spaning members at a point between the first and second ends of the first pair of spaning members;
   f. a second longitudinal member which partially encloses the other cable and rests on top of the other cable;
   g. a pair of second vertical members spaced apart and oriented vertically with respect to the second longitudinal member and each vertical member having a top edge and a bottom edge, the second longitudinal member joined near the bottom edge of the second vertical members and forming an inverted U-shaped configuration which encompasses a portion of the cable;

h. a third horizontal bar member joining the two second vertical members adjacent their top edges;
i. a pair of second spaning members angled upwardly from the top edges of the second vertical members, the spaning members each having a first end and a second end, the first ends joined at the top edges of the second vertical members, the second spaning members defining a plane, the second ends of the pair of first spaning members joined to corresponding second ends of the pair of second spaning members forming an apex;
j. a fourth horizontal bar member joining the pair of second spaning members at a point between the first and second ends of the pair of second spaning members;
k. a sheet means covering the planes formed by the pairs of first and second spaning members; and
l. a pair of hand rails, joined to the top edges of the first vertical members and the top edges of the second vertical members.

3. The man crossover as recited in claim 2 including a pair of flat U-shaped deformable members fitting around each first and second longitudinal member and cable face-to-face, with extending legs of each U-shaped member bent around the bottom portion of the other U-shaped member for fastening the longitudinal members to the cables.

* * * * *